(12) United States Patent
Kogo et al.

(10) Patent No.: US 7,317,580 B2
(45) Date of Patent: Jan. 8, 2008

(54) ZOOM LENS

(75) Inventors: Shoji Kogo, Tokyo (JP); Masae Sato, Tokyo (JP); Susumu Yamaguchi, Tokyo (JP); Hiroshi Sato, Tokyo (JP); Yuuichi Atarashi, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 167 days.

(21) Appl. No.: 11/077,035

(22) Filed: Mar. 11, 2005

(65) Prior Publication Data

US 2005/0200973 A1 Sep. 15, 2005

(30) Foreign Application Priority Data

| Mar. 12, 2004 | (JP) | ............................. 2004-070398 |
| Mar. 12, 2004 | (JP) | ............................. 2004-070399 |
| Sep. 7, 2004 | (JP) | ............................. 2004-259533 |

(51) Int. Cl.
*G02B 3/12* (2006.01)
*G02B 15/14* (2006.01)

(52) U.S. Cl. ....................... 359/666; 359/676; 359/683; 359/684; 359/685; 359/686; 359/689; 359/692; 359/708; 359/740; 359/721; 359/737; 359/713; 359/714; 359/715; 359/716; 359/717

(58) Field of Classification Search ........ 359/665–667, 359/676–692, 708–717, 740, 721, 737
See application file for complete search history.

(56) References Cited

U.S. PATENT DOCUMENTS

| 4,407,567 | A | * | 10/1983 | Michelet et al. | ............ 359/676 |
| 4,784,479 | A | * | 11/1988 | Ikemori | ...................... 359/676 |
| 2002/0176148 | A1 | * | 11/2002 | Onuki et al. | ................ 359/253 |

FOREIGN PATENT DOCUMENTS

| JP | 59-116711 | 7/1984 |
| JP | 2002-350726 | 12/2002 |
| JP | 2003-098435 | 4/2003 |

\* cited by examiner

*Primary Examiner*—Evelyn A. Lester
(74) *Attorney, Agent, or Firm*—Finnegan, Henderson, Farabow, Garrett & Dunner, L.L.P.

(57) ABSTRACT

In this invention, to provide a compact zoom lens having a small number of optical element groups to be driven and a simple moving mechanism, at least one of a plurality of optical element groups arranged in the lens system includes a refractive power variable element of a transmission type which has a compensation function to correct focus movement caused by zooming and a focus function to correct focus movement caused by a variation in inter-object distance. The refractive power variable element is a liquid optical element including a first liquid having a conductivity or a polarity and a second liquid which is not mixed with the first liquid, the first liquid and the second liquid being enclosed in a container fluid-tight so as to define an interface therebetween having a predetermined shape, the liquid optical element being arranged such that a refractive power thereof is adjusted by changing a curvature of the interface.

10 Claims, 9 Drawing Sheets

ZOOM LENS

This application is based on and claims priority under 35 U.S.C. § 119 from the Japanese Patent Applications Nos. 2004-070398, 2004-070399 and 2004-259533 filed in Japan on Mar. 12, 2004, Mar. 12, 2004 and Sep. 7, 2004, respectively, at least respective entire contents of which are incorporated herein by reference.

TECHNOLOGICAL FIELD

The present invention relates to a zoom lens and, more particularly, to compact zoom lens used in a solid-state image sensing element such as a CCD image sensor or CMOS image sensor.

TECHNOLOGICAL BACKGROUND

In recent years, as image sensing apparatuses using a solid-state image sensing element such as a CCD (Charge Coupled Device) image sensor or CMOS (Complementary Metal Oxide Semiconductor) image sensor increase their performance and reduce the size, cellular phones and PDA (Personal Digital Assistances) with a subminiature digital camera or image sensing apparatus are becoming popular. In addition, demand to mount a zoom lens in these image sensing apparatuses is growing.

In a general zoom lens, all or some of lens groups included in the image sensing lens must be moved. In, e.g., a 3-group zoom lens, lens groups are divided into three groups: a variator group which changes the focal length, a compensator group which corrects focus movement caused by the change in focal length, and a focus group which corrects focus movement caused by the change in object distance, or a variator group, a group having a compensator and focus function, and a fixed group. Of the lens groups, predetermined lens groups are moved in the coaxial direction to execute zooming and focus adjustment. As a detailed example of such a zoom optical system, a zoom lens which executes zooming and focus adjustment by moving two or three groups is disclosed (Japanese Unexamined Patent Publication No. 2002-350726).

As disclosed in Unexamined Patent Publication No. 2002-350726, when a plurality of lens groups are moved in the coaxial direction to execute zooming and focus adjustment, a moving mechanism to move the lens groups is necessary. The moving mechanism is generally complex. In addition, a wide space is necessary to arrange the moving mechanism.

Another zoom lens is known, which decreases the number of moving groups by using a refractive power variable element and imparts, to this element, the focus movement correction function for zooming or a variation in inter-object distance. As a detailed example of such a zoom lens, a zoom lens using a reflection refractive power variable element is also disclosed (Japanese Unexamined Patent Publication No. 2003-98435).

However, when the reflection optical element disclosed in Japanese Unexamined Patent Publication No. 2003-98435 is used, aberration asymmetrical with respect to the co-axis is generated. To correct the aberration, the reflecting surface must be, e.g., a free-form surface which is hard to control.

SUMMARY OF THE INVENTION

The present invention has been made in consideration of the above problems of the prior arts, and has as its object to provide a compact zoom lens which includes a small number of drive lens groups and a simple moving mechanism by causing at least one of lens groups each having a plurality of lenses to include a refractive power variable element of a transmission type.

It is another object of the present invention to provide a zoom lens which has an excellent maximum transmittance by making use of a liquid optical element and its drive means.

In order to achieve the above objects, according to a first aspect of the present invention, there is provided a zoom lens in which a plurality of optical element groups including at least an optical element group which moves in zooming are arranged in a lens system, comprising: a refractive power variable element of a transmission type which is mounted in at least one of the plurality of optical element groups, the refractive power variable element having a compensation function to correct focus movement caused by zooming and a focus function to correct focus movement caused by a variation in inter-object distance.

The optical system including the optical element group which moves during zooming includes the refractive power variable element which has the compensation function to correct focus movement caused by zooming and the focus function to correct focus movement caused by a variation in inter-object distance. With this structure, the moving amount of the optical element group which moves for compensation and focusing can be suppressed small. Alternatively, the optical element group which requires a mechanical driving mechanism can be only the zooming group. Hence, a compact zoom lens having a small number of optical element groups to be driven and a simple moving mechanism can be implemented.

According to a second aspect of the present invention, there is provided a zoom lens in which a plurality of optical element group including at least an optical element group which moves in zooming are arranged in a lens system, comprising: at least a refractive power variable element of a transmission type provided in the plurality of optical element groups; an electromechanical conversion element which is extendible/contractible by applying thereto a drive voltage in the form of predetermined pulses; a drive member fixed to one end of the electro-mechanical conversion element; a movable member coupled to the optical element group and movably mounted on the drive member; and a drive means for moving the movable member through repetitions of extension and contraction of the electromechanical conversion element at different speeds in directions of extension and contraction which is caused by applying the drive voltage in the form of the predetermined pulses to the electromechanical conversion element.

In the above-mentioned drive means, by applying a drive voltage in the form of, for example, pulses each having a saw-toothed shape to the electromechanical conversion element for an extreme short time, the electromechanical conversion element can be deformed so as to be slightly expanded or contracted, and further, the speeds of extensions and contractions can be changed in accordance with a waveform of the pulses. At this stage, when the electromechanical conversion element is deformed in a direction of extension or contraction at a high speed, the movable member does not follow the motion of the drive member but stays at a position as it is due to its mass inertia. Meanwhile, when the electromechanical element is deformed at a slower speed in a reverse direction, the movable member is moved following the motion of the drive member due to a friction effecting therebetween. Thus, due to repetitions of extension and contraction of the electromechanical conversion element, the movable member can be continuously moved in one direction. That is, with the use of the drive means according to the present invention, having a high responsiveness, the optical element groups which are moved upon zooming can be moved at a high speed, and can be also moved by a slight displacement. Further, in such a case that the optical element groups which are moved upon zooming, are held in position, when the supply of an electric power to the electromechanical conversion element is interrupted, they are held by a friction force between the movable member and the drive member, thereby it is possible to aim at saving energy. In addition, it can offer such an advantage that the configuration of the drive means can be simplified, and can be at a low cost.

According to a third aspect of the present invention, there is provided a zoom lens according to the first aspect, wherein a refractive power of the optical element group including the refractive power variable element of a transmission type has an extremum during zooming.

When the refractive power of the optical element group including the refractive power variable element has an extremum during zooming, the change in refractive power of the refractive power variable element can be made small during zooming. Hence, the refractive power variable element can be easily controlled.

According to a fourth aspect of the present invention, there is provided a zoom lens according to one of the first to third aspects, wherein the refractive power is changed by changing a radius of curvature of an optical surface at which the refractive power variable element contacts air.

According to a fifth aspect of the present invention, there is provided a zoom lens according to any one of the first to third aspects, wherein the refractive power is changed by changing a refractive index of an optical material of the optical element.

When the refractive power is changed by changing the radius of curvature of the optical surface at which the refractive power variable element contacts air, the absolute value of the refractive power of the interface between the optical surface and the medium in contact the optical surface is large as compared to a case in which the medium which contacts the optical surface is not air. In other words, if the interface has the same absolute value of the refractive power, the refractive power variable element whose optical surface contacts air can increase the absolute value of the radius of curvature of the optical surface as compared to a refractive power variable element whose optical surface contacts a medium except air. For this reason, aberration generated on the interface can be reduced. When the refractive power is changed by changing the refractive index of the optical material of the optical element, the variation in higher order aberration in changing the refractive power can be made small as compared to the refractive power variable element which changes the refractive power by changing the shape of the optical element surface.

According to a sixth aspect of the present invention, there is provided a zoom lens according to any one of the first to fifth aspects, wherein only one optical element group moves in zooming.

When only one optical element group moves in zooming, a zoom lens having a small number of optical element groups to be driven and a simple moving mechanism can be implemented.

According to a seventh aspect of the present invention, there is provided a zoom lens according to any one of the first to sixth aspects, wherein a position of the optical element group including the refractive power variable element is fixed in a direction of an optical axis.

When the position of the optical element group including the refractive power variable element is fixed in the direction of the optical axis, the moving mechanism including the wiring of a flexible cable for the liquid optical element can be more simple as compared to a case in which the optical element group including the liquid optical element moves.

According to an eighth aspect of the present invention, there is provided a zoom lens according to the first aspect, wherein the zoom lens comprises a refractive power variable element of a transmission type mounted in an optical element group which moves in zooming, the refractive power variable element having a compensation function to correct focus movement caused by zooming, a focus function to correct focus movement caused by a variation in inter-object distance, and a zooming function.

In the optical system including the optical element group which moves during zooming, the optical element group which moves in zooming includes the refractive power variable element and has the compensation function to correct focus movement caused by zooming, focus function to correct focus movement caused by a variation in inter-object distance, and zooming function. With this structure, the moving amount of the zooming group in zooming or the moving amount of the moving optical element group to correct focus movement caused by a variation in inter-object distance can be suppressed small. Alternatively, the optical element group which requires a mechanical driving mechanism can be only the zooming group. Hence, a compact zoom lens having a small number of optical element groups to be driven and a simple moving mechanism while suppressing the moving amount of the moving optical element group small can be implemented. Having a zooming function indicates that the absolute value of the refractive power of the group including the liquid optical element serving as the zooming group is larger at the long focal length end than at the short focal length end.

According to a ninth aspect of the present invention, there is provided a zoom lens according to any one of the first to eighth aspects, wherein the optical element group including the refractive power variable element includes a diaphragm.

When the optical element group, which includes the refractive power variable element, includes a diaphragm, the diameter of the refractive power variable element can be made small, and a compact zoom lens can be implemented.

According to a 10th aspect of the present invention, there is provided a zoom lens according to the first aspect, wherein the refractive power variable element of a transmission type comprises a liquid optical element including a first liquid having a conductivity or a polarity and a second liquid which is not mixed with the first liquid, the first liquid and the second liquid being enclosed in a container fluid-tight so as to define an interface therebetween having a predetermined shape, the liquid optical element being arranged such that a refractive power thereof is adjusted by changing a curvature of the interface.

With the use of the liquid optical element as an component, since the curvature of the interface is changed so as to adjust the refractive power, a compensation operation for correcting a focus movement caused by zooming, and a focus function for correcting a focus movement caused by a variation in an object distance can be materialized, the displacement of the optical element group adapted to move for the compensation and the focusing can be restrained to a small value, and the optical element groups which require a mechanical drive mechanism can be limited to those for zooming, thereby it is possible to provide a small-sized zoom lens having a less number of optical element groups which have to be moved and having a simple mechanical system. In particular, the above-mentioned liquid type optical element is substantially transparent and has an excellent maximum transmittance.

According to an 11th aspect of the present invention, there is provided a zoom lens according to the $10^{th}$ aspect, wherein the liquid optical element is arranged in an optical element group which includes a diaphragm. With this configuration, the outer diameter of the liquid optical element can be decreased, thereby it is possible to provide a small-size zoom lens.

According to a 12th aspect of the present invention, there is provided a zoom lens according to the $10^{th}$ aspect, wherein in the case of an optical element group which does not include a diaphragm but the liquid optical element, the liquid optical element is arranged at a position neared to the diaphragm. With this configuration, the outer diameter of the liquid optical element can be decreased.

According to a 13th aspect of the present invention, there is provided a zoom lens according to any one the 10th, 11th and 12th aspects, wherein one of the optical element groups is moved upon zooming. Thereby it is possible to a zoom lens having a less number of optical element groups to be moved, and having a simple mechanical system.

According to a 14th aspect of the present invention, there is provided a zoom lens according to any one of the $10^{th}$ and 11th to 13th aspects, wherein the optical element group including the liquid optical element is fixed in the direction of the optical axis, and the optical element group including the liquid optical element has a compensation function for correcting a focus movement caused by zooming and a focus function for correcting a focus movement caused by a variation in object distance.

With this configuration in which the optical element group including the liquid optical lens is fixed in the direction of the optical axis, and performs the compensation function for correcting a focus movement caused by zooming and a focus function for correcting a focus movement caused by a variation in object distance, the displacement of the optical element groups to be moved can be suppressed to a small value, and the optical element groups which require a mechanical operating mechanism can be limited to those for zooming, thereby it is possible to provide a zoom lens having a less number of optical element groups to be driven and a simple mechanical configuration in which the wiring of flexible cables and the like for the liquid optical element can be simplified in comparison with a zoom lens in which the optical element group including the liquid optical element is moved.

According to a 15th aspect of the present invention, there is provided a zoom lens according to the second aspect, wherein each of the pluses has a saw-toothed shape.

According to a 16th aspect of the present invention, there is provided a camera comprises a zoom lens having at least an optical element group provided in a plurality of optical element groups arranged in a lens system, the optical element group being made to move in zooming, and at least a refractive power variable element of a transmission type having a compensation function to correct focus movement caused by zooming and a focus function to correct focus movement caused by a variation in inter-object distance.

As is clearly understood from the foregoing aspects, according to the present invention, at least one of lens systems including a plurality of lenses includes the refractive power variable element of a transmission type. With this structure, a compact zoom lens having a small number of optical element groups to be driven and a simple moving mechanism can be provided.

The above and many other features, objects and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Preferred embodiments of the present invention will be described below with reference to the accompanying drawings.

Figure 1A:
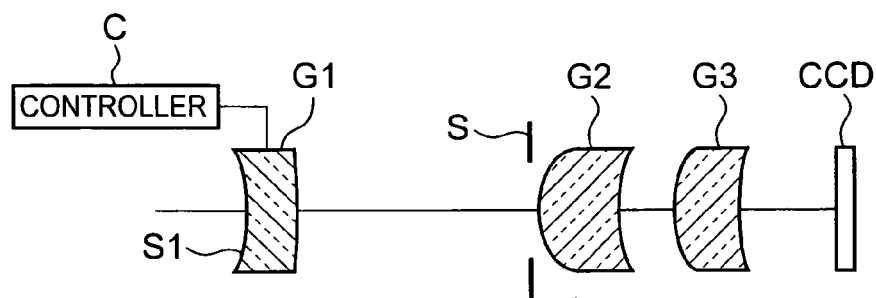
FIGS. 1A and 1B are schematic views of a zoom lens according to the first embodiment of the present invention.
Figure 1B:
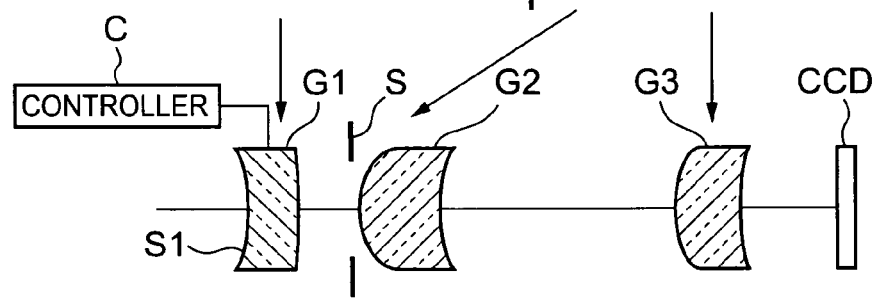

FIGS. 1A and 1B are schematic views of a zoom lens according to the first embodiment of the present invention. FIG. 1A shows the short focal length end, and FIG. 1B shows the long focal length end. Since they are simple illustrations, the lenses do not correspond to actual optical surface shapes. The zoom lens according to the first embodiment has lens groups G1 to G3 to form an object image on an image sensing element CCD. The first lens group G1 is a refractive power variable element which is fixed to a mirror frame (not shown). The second lens group G2 includes normal lenses integrated with a diaphragm S and can be moved in the direction of the optical axis by a driving source (not shown). The third lens group G3 includes normal lenses and is fixed to a mirror frame (not shown). The third lens group G3 is not always essential.

Figure 3:
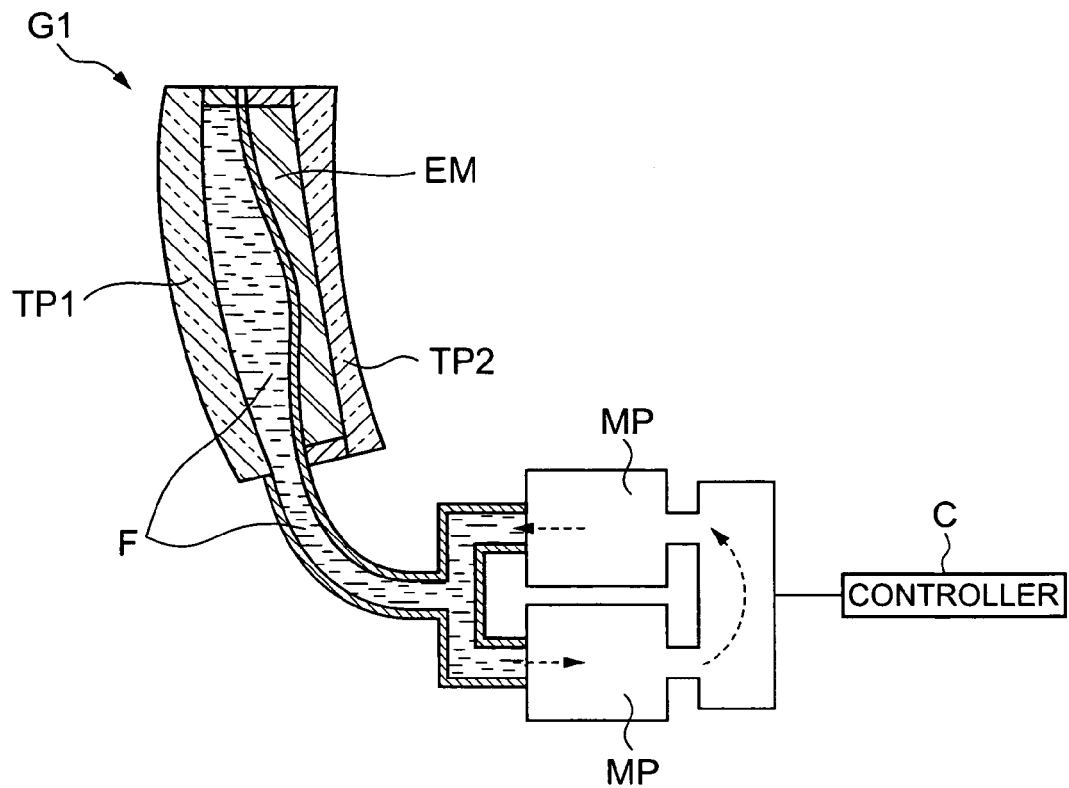
FIG. 3 is a schematic view showing an example of a refractive power variable element which can suitably be used in the zoom lens according to the embodiment of the present invention.

FIG. 3 is a schematic view showing the refractive power variable element G1 which can be applied to the zoom lenses according to the first embodiment. The refractive power variable element G1 shown in FIG. 3 can change the lens surface and accordingly the refractive power by causing a micropump MP to flow a fluid F in and out. The micropump MP is a small pump formed by, e.g., micromachining and can be driven by a signal from a controller C shown in FIGS. 1A and 1B. The fluid F is stored between a transparent substrate TP1 and an elastic body EM. Referring to FIG. 3, a transparent substrate TP2 to protect the elastic body EM can be omitted. Other examples of a pump formed by micromachining are a pump using thermal deformation, a pump using a piezoelectric material, and a pump using static electricity.

The operation of the zoom lens according to the first embodiment will be described. When zoom driving is executed from the short focal length end to the long focal length end, the second lens group G2 is driven in the direction of the optical axis from the position shown in FIG. 1A to the position shown in FIG. 1B, as shown in FIGS. 1A and 1B. In zoom driving from the long focal length end to the short focal length end, a reverse operation is performed.

According to a conventional zoom lens, as the second lens group G2 moves in the direction of the optical axis, the first lens group G1 must be moved in the direction of the optical axis to obtain the compensation function. To move the first lens group G1 in the direction of the optical axis, a cam mechanism or the like must be prepared. This results in a complex structure or an increase in size of the image sensing apparatus in which the zoom lens is mounted.

Contrarily, in the zoom lens of the first embodiment, the controller C changes the shape of an optical surface S1 of the first lens group G1 as the second lens group G2 moves in the direction of the optical axis. Hence, the compensation function can be implemented by using the change in refractive power. No mechanism to move the first lens group G1 in the direction of the optical axis is necessary so that the structure can be simple and compact.

In the conventional zoom lens, the moving amount of the second lens group G2 in the direction of the optical axis and that of the first lens group G1 in the direction of the optical axis are in a one-to-one correspondence because of the cam shape. In actual image sensing, the object distance changes. To obtain an in-focus state on the light-receiving surface of the image sensing element CCD in accordance with the object distance, a so-called focusing function is implemented by, e.g., displacing the third lens group G3 in the direction of the optical axis. In this case, another driving mechanism must separately be prepared for the third lens group G3, resulting in a complex and bulky structure.

In the zoom lens according to the first embodiment, however, the controller C can change the shape of the optical surface S1 of the first lens group G1 on the basis of the zoom signal (or the moving amount of the second lens group G2 in the direction of the optical axis) and the signal from the image sensing element CCD or the distance measurement signal from a distance measuring device (not shown) so that the compensation function and focusing function can be implemented simultaneously. In this case, the third lens group G3 need not be displaced in the direction of the optical axis. When the refractive power of the first lens group G1 including the refractive power variable element has an extremum during zooming, the change in refractive power of the first lens group G1 can be made small during zooming. Hence, the controller C can easily control the refractive power variable element.

Figure 4:
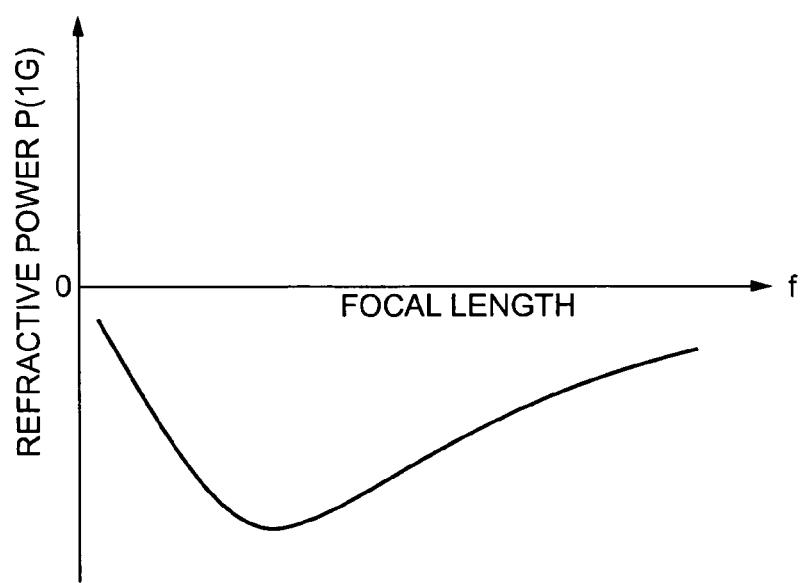
FIG. 4 is a graph showing the relationship between the refractive power (ordinate) and focal length (abscissa) in the zoom lens according to the present invention.

To "have an extremum" will be described. For example, assume a zoom lens having a 3-group structure including a first lens group having a negative refractive power, a second lens group having a positive refractive power, and a third lens group having a positive refractive power. The first lens group is a fixed group including a refractive power variable element. The second lens group is a zooming group which moves in zooming. The third lens group is a fixed group. To correct focus movement caused by zooming, a refractive power P (G1) of the first lens group takes an extremum, at which the absolute value of the refractive power is maximum, and then becomes small gradually as the focal length of the zoom lens increases, as shown in FIG. 4. When the zoom lens is formed in the range where the refractive power of the first lens group has the extremum, the change in refractive power of the refractive power variable element can be made as small as possible.

Figure 2A:
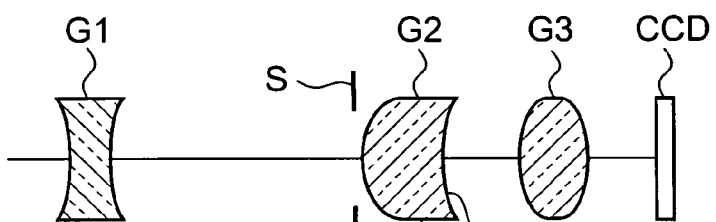
FIGS. 2A and 2B are schematic views of a zoom lens according to the second embodiment of the present invention.
Figure 2B:
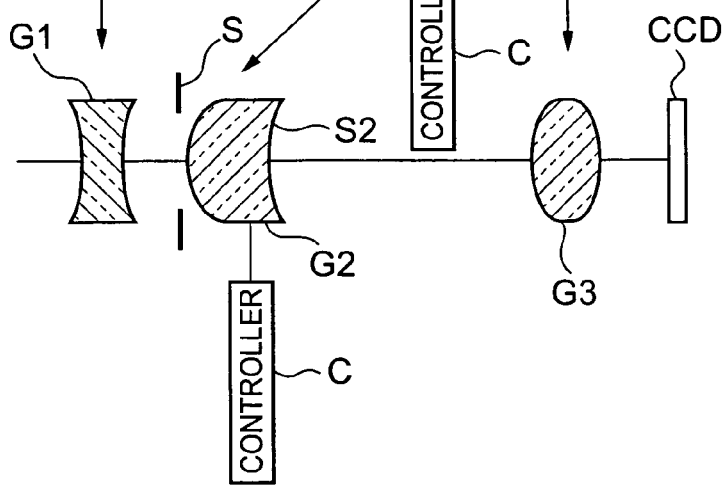

FIGS. 2A and 2B are schematic views of a zoom lens according to the second embodiment of the present invention. FIG. 2A shows the short focal length end, and FIG. 2B shows the long focal length end. Since they are simple illustrations, the lenses do not correspond to actual optical surface shapes. The zoom lens according to the second embodiment has lens groups G1 to G3 to form an object image on an image sensing element CCD. The first lens group G1 includes normal lenses and is fixed to a mirror frame (not shown). The second lens group G2 is a refractive power variable element integrated with a diaphragm S and can be moved in the direction of the optical axis by a driving source (not shown). The third lens group G3 includes normal lenses and is fixed to a mirror frame (not shown). The third lens group G3 is not always essential.

The second lens group G2 is supported by a mirror frame (not shown) and comprises a hollow member which stores a liquid or gas inside and has an optical surface S2 made of a transparent flexible film. Like the refractive power variable element shown in FIG. 3, the internal pressure of the second lens group G2 can be adjusted by an external controller C. The shape of the optical surface S2, i.e., the refractive power can be changed by changing the internal pressure.

The operation of the zoom lens according to the second embodiment will be described. When zoom driving is executed from the short focal length end to the long focal length end, the second lens group G2 is driven in the direction of the optical axis from the position shown in FIG. 2A to the position shown in FIG. 2B, as shown in FIGS. 2A and 2B. In zoom driving from the long focal length end to the short focal length end, a reverse operation is performed.

In the zoom lens according to the second embodiment, the controller C changes the shape of the optical surface S2 of the second lens group G2 as it moves in the direction of the optical axis. Hence, the compensation function can be implemented by using the change in refractive power. No mechanism to move the first lens group G1 in the direction of the optical axis is necessary so that the structure can be simple and compact.

Further, in the zoom lens according to the second embodiment, the controller C can change the shape of the optical surface S2 of the second lens group G2 on the basis of the zoom signal (or the moving amount of the second lens group G2 in the direction of the optical axis) and the signal from the image sensing element CCD or the distance measurement signal from a distance measuring device (not shown) so that the compensation function and focusing function can be implemented simultaneously. In this case, the third lens group G3 need not be displaced in the direction of the optical axis. When the refractive power of the optical element group including the second lens group G2 has an extremum during zooming, the change in refractive power of the second lens group G2 can be made small during zooming. Hence, the controller C can easily control the refractive power variable element.

In the first and second embodiments, when the refractive power variable element has a perfect zooming function, all lens groups can be fixed in the direction of the optical axis so that a zoom lens having no lens group driving mechanism can also be implemented.

Exemplified embodiments of the zoom lens of the present invention will be described below. Symbols used in Exemplified embodiments are as follows.

P1(W), P1(M), and P1(T): the refractive powers of the first lens at the short, intermediate, and long focal length ends HF1(W), HF1(M), and HF1(T): the distances from the near-side principal point of the first lens group to the surface apex of the first lens group closest to the object at the short, intermediate, and long focal length ends HR1(W), HR1(M), and HR1(T): the distances from the far-side principal point of the first lens group to the surface apex of the first lens group closest to the image at the short, intermediate, and long focal length ends HD1(W), HD1(M), and HD1(T): the distances from the near-side principal point to the far-side principal point of the first lens group at the short, intermediate, and long focal length ends D1(W), D1(M), and D1(T): the distances from the surface apex of the first lens group closest to the image to the surface apex of the second lens group closest to the object at the short, intermediate, and long focal length ends P2(W), P2(M), and P2(T): the refractive powers of the second lens at the short, intermediate, and long focal length ends HF2(W), HF2(M), and HF2(T): the distances from the near-side principal point of the second lens group to the surface apex of the second lens group closest to the object at the short, intermediate, and long focal length ends HR2(W), HR2(M), and HR2(T): the distances from the far-side principal point of the second lens group to the surface apex of the second lens group closest to the image at the short, intermediate, and long focal length ends HD2(W), HD2(M), and HD2(T): the distances from the near-side principal point to the far-side principal point of the second lens group at the short, intermediate, and long focal length ends D2(W), D2(M), and D2(T): the distances from the surface apex of the second lens group closest to the image to the surface apex of the third lens group closest to the object at the short, intermediate, and long focal length ends P3(W), P3(M), and P3(T): the refractive powers of the third lens at the short, intermediate, and long focal length ends HF3(W), HF3(M), and HF3(T): the distances from the near-side principal point of the third lens group to the surface apex of the third lens group closest to the object at the short, intermediate, and long focal length ends HR3(W), HR3(M), and HR3(T): the distances from the far-side principal point of the third lens group to the surface apex of the third lens group closest to the image at the short, intermediate, and long focal length ends HD3(W), HD3(M), and HD3(T): the distances from the near-side principal point to the far-side principal point of the third lens group at the short, intermediate, and long focal length ends D3(W), D3(M), and D3(T): the distances from the surface apex of the third lens group closest to the image to the image surface at the short, intermediate, and long focal length ends f(W), f(M), and f(T): the focal lengths of the zoom lens at the short, intermediate, and long focal length ends L(W), L(M), and L(T): the total lengths of the zoom lens at the short, intermediate, and long focal length ends Exemplified Embodiment 1

Exemplified embodiment 1 to be described below corresponds to the zoom lens according to the above-described first embodiment.

More specifically, the focal lengths, principal points, and principal point intervals of the respective groups, the group intervals, the focal length of the entire system, and the total length at object distance $T=\infty$ of the zoom lens are shown in Table 1. The focal lengths, principal points, and principal point intervals of the first lens group serving as a refractive power variable element at the short and long focal length ends at object distance T=250 mm are shown in Table 2. The object distance indicates the distance from the object to the surface apex of the zoom lens closest to the object. For HF, HR, and HD in the tables, the direction from the object to the image is defined as positive.

TABLE 1

(Short Focal Length End: W) T = ∞

| | | | | | |
|---|---|---|---|---|---|
| First Group | P1 (W) = −0.082 | HF1 (W) = 0.596 | HR1 (W) = 5.707 | HD1 (W) = 1.198 | D1 (W) = 9.254 |
| Second Group | P2 (W) = 0.114 | HF2 (W) = 4.489 | HR2 (W) = 4.767 | HD2 (W) = 4.238 | D2 (W) = 1.500 |
| Third Group | P3 (W) = 0.086 | HF3 (W) = 0.228 | HR3 (W) = 2.319 | HD3 (W) = 1.181 | D3 (W) = 2.526 |
| Overall System | f (W) = 4.450 | L (W) = 27.379 | | | |

(Intermediate Focal Length End: M) T = ∞

| | | | | | |
|---|---|---|---|---|---|
| First Group | P1 (M) = −0.092 | HF1 (M) = 0.245 | HR1 (M) = 5.228 | HD1 (M) = 1.327 | D1 (M) = 4.779 |
| Second Group | P2 (M) = 0.114 | HF2 (M) = 4.489 | HR2 (M) = 4.767 | HD2 (M) = 4.238 | D2 (M) = 5.975 |
| Third Group | P3 (M) = 0.086 | HF3 (M) = 0.228 | HR3 (M) = 2.319 | HD3 (M) = 1.181 | D3 (M) = 2.526 |
| Overall System | f (M) = 7.224 | L (M) = 27.379 | | | |

(Long Focal Length End: T) T = ∞

| | | | | | |
|---|---|---|---|---|---|
| First Group | P1 (T) = −0.082 | HF1 (T) = 0.596 | HR1 (T) = 5.707 | HD1 (T) = 1.198 | D1 (T) = 0.953 |
| Second Group | P2 (T) = 0.114 | HF2 (T) = 4.489 | HR2 (T) = 4.767 | HD2 (T) = 4.238 | D2 (T) = 9.801 |
| Third Group | P3 (T) = 0.086 | HF3 (T) = 0.228 | HR3 (T) = 2.319 | HD3 (T) = 1.181 | D3 (T) = 2.526 |
| Overall System | f (T) = 11.109 | L (T) = 27.379 | | | |

TABLE 2

| | (Short Focal Length End: W) | | T = 250 mm | |
|---|---|---|---|---|
| First Group | P1(W) = −0.079 | HF1(W) = 0.716 | HR1(W) = 5.875 | HD1(W) = 1.152 |
| | (Long Focal Length End: T) | | T = 250 mm | |
| First Group | P1(T) = −0.089 | HF1(T) = 0.342 | HR1(T) = 5.364 | HD1(T) = 1.288 |

As shown in Table 1, when the focal length is changed from the short focal length end to the long focal length end, and the refractive power of the first lens group G1 is changed simultaneously, compensation to correct focus movement caused by zooming is executed. In addition, as shown in Table 2, focusing can also be executed by changing the refractive power of the refractive power variable element as the object distance changes. For this reason, lens groups other than the second lens group G2 serving as an optical element group having a zooming function can be fixed.

More specifically, the focal lengths, principal points, and principal point intervals of the respective groups, the group intervals, the focal length of the entire system, and the total length at object distance T=∞ of the zoom lens are shown in Table 3. The focal lengths, principal points, and principal point intervals of the second lens group serving as a refractive power variable element at the short and long focal length ends at object distance T=250 mm are shown in Table 4. The object distance indicates the distance from the object to the surface apex of the zoom lens closest to the object. For HF, HR, and HD in the tables, the direction from the object to the image is defined as positive.

TABLE 3

| | (Short Focal Length End: W) T = ∞ | | | | |
|---|---|---|---|---|---|
| First Group | P1 (W) = −0.111 | HF1 (W) = −1.062 | HR1 (W) = 1.030 | H01 (W) = 0.937 | D1 (W) = 6.552 |
| Second Group | P2 (W) = 0.171 | HF2 (W) = 2.538 | HR2 (W) = 4.020 | HD2 (W) = 3.886 | D2 (W) = 0.997 |
| Third Group | P3 (W) = 0.098 | HF3 (W) = −0.730 | HR3 (W) = 0.626 | HD3 (W) = 0.652 | D3 (W) = 2.378 |
| Overall System | f (W) = 4.519 | L (W) = 20.332 | | | |
| | (Intermediate Focal Length End: M) T = ∞ | | | | |
| First Group | P1 (M) = −0.111 | HF1 (M) = −1.062 | HR1 (M) = 1.030 | HD1 (M) = 0.937 | D1 (M) = 4.027 |
| Second Group | P2 (M) = 0.167 | HF2 (M) = 2.643 | HR2 (M) = 4.082 | HD2 (M) = 3.930 | D2 (M) = 3.522 |
| Third Group | P3 (M) = 0.098 | HF3 (M) = −0.730 | HR3 (M) = 0.626 | HD3 (M) = 0.652 | D3 (M) = 2.378 |
| Overall System | f (M) = 6.999 | L (M) = 20.332 | | | |
| | (Long Focal Length End: T) T = ∞ | | | | |
| First Group | P1 (T) = −0.111 | HF1 (T) = −1.062 | HR1 (T) = 1.030 | HD1 (T) = 0.937 | D1 (T) = 1.119 |
| Second Group | P2 (T) = 0.179 | HF2 (T) = 2.353 | HR2 (T) = 3.910 | HD2 (T) = 3.810 | D2 (T) = 6.430 |
| Third Group | P3 (T) = 0.098 | HF3 (T) = −0.730 | HR3 (T) = 0.626 | HD3 (T) = 0.652 | D3 (T) = 2.378 |
| Overall System | f (T) = 11.060 | L (T) = 20.332 | | | |

TABLE 4

| | (Short Focal Length End: W) | | T = 250 mm | |
|---|---|---|---|---|
| Second Group | P2(W) = 0.173 | HF2(W) = 2.499 | HR2(W) = 3.997 | HD2(W) = 3.869 |
| | (Long Focal Length End: T) | | T = 250 mm | |
| Second Group | P2(T) = 0.182 | HF2(T) = 2.280 | HR2(T) = 3.868 | HD2(T) = 3.780 |

Hence, a zoom lens having a small number of drive lens groups and a simple moving mechanism can be implemented.

When the refractive power of the refractive power variable element has an extremum during zooming to change the focal length from the short focal length end to the long focal length end, the change in refractive power of the refractive power variable element during zooming can be made small. Hence, the refractive power variable element can easily be controlled.

Exemplified Embodiment 2

Exemplified embodiment 2 to be described below corresponds to the zoom lens according to the above-described second embodiment.

As shown in Table 3, when the focal length is changed from the short focal length end to the long focal length end, and the refractive power of the second lens group G2 is changed simultaneously, compensation to correct focus movement caused by zooming is executed while contributing to zoom. In addition, as shown in Table 4, focusing can also be executed by changing the refractive power of the refractive power variable element as the object distance changes. For this reason, lens groups other than the second lens group serving as an optical element group having a zooming function can be fixed. Hence, a zoom lens which has a small number of drive lens groups and a simple moving mechanism while suppressing the moving amount of the moving lens group small can be implemented.

When the refractive power of the refractive power variable element has an extremum during zooming to change the focal length from the short focal length end to the long focal length end, the change in refractive power of the refractive power variable element during zooming be made small. Hence, the refractive power variable element can easily be controlled.

Hereinafter, third and fourth embodiments, and exemplified embodiments 3 and 4 in relation to the third and fourth embodiments are explained. In the third and fourth embodiments, a liquid optical element is used as a refractive power variable element.

Figure 5A:
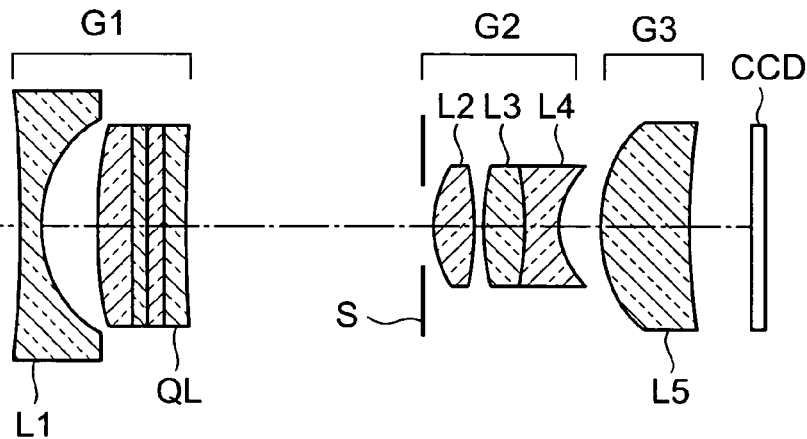
FIGS. 5A to 5C are sectional views illustrating a zoom lens in a first embodiment of the present invention.
Figure 5B:
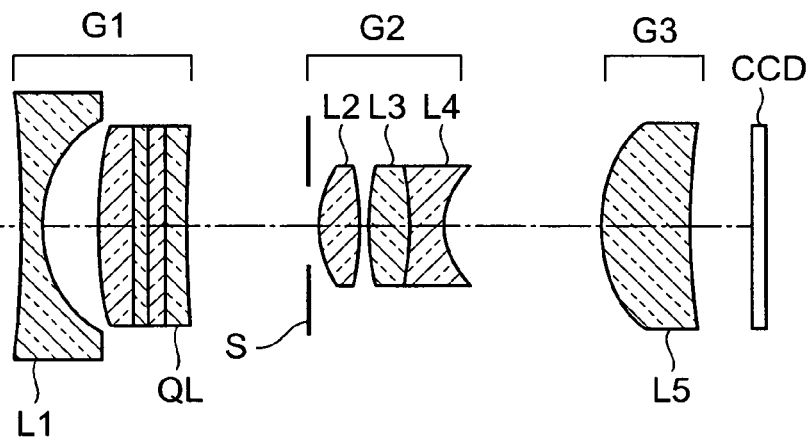
Figure 5C:
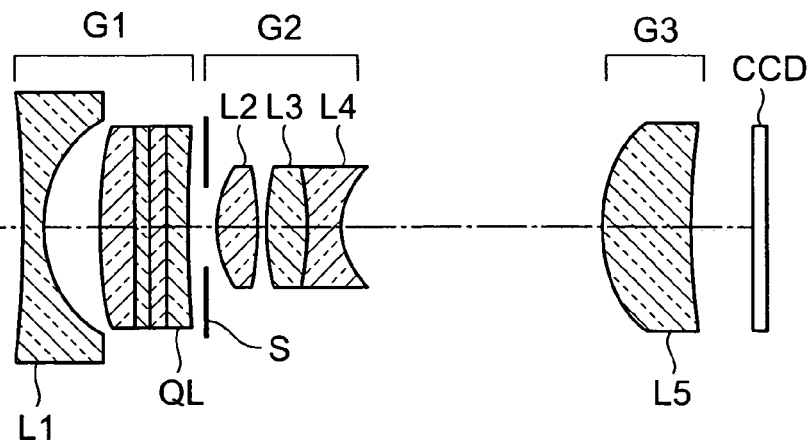

FIGS. 5A to 5C are sectional views which show a zoom lens in a first embodiment of the present invention, and among which FIG. 5A shows a short focal distance end condition, FIG. 5B shows an intermediate position, and FIG. 5C shows a long focal distance end condition. In the configuration of the first embodiment, the zoom lens has lens groups G1 to G3 for focusing an object image on an image pick-up element CCD. The first lens group G1 is composed of a negative first lens L1 and a liquid optical element QL which are fixed to a lens frame which is not shown. The second lens group G2 is composed of a diaphragm S, a positive second lens L2, a positive third lens L3 and a negative fourth lens L4, which are moved integrally in an optical direction by a drive source which is not shown. The third lens group G3 is composed of a positive fifth lens L5 which is fixed to a lens frame which is not shown.

Figure 6:
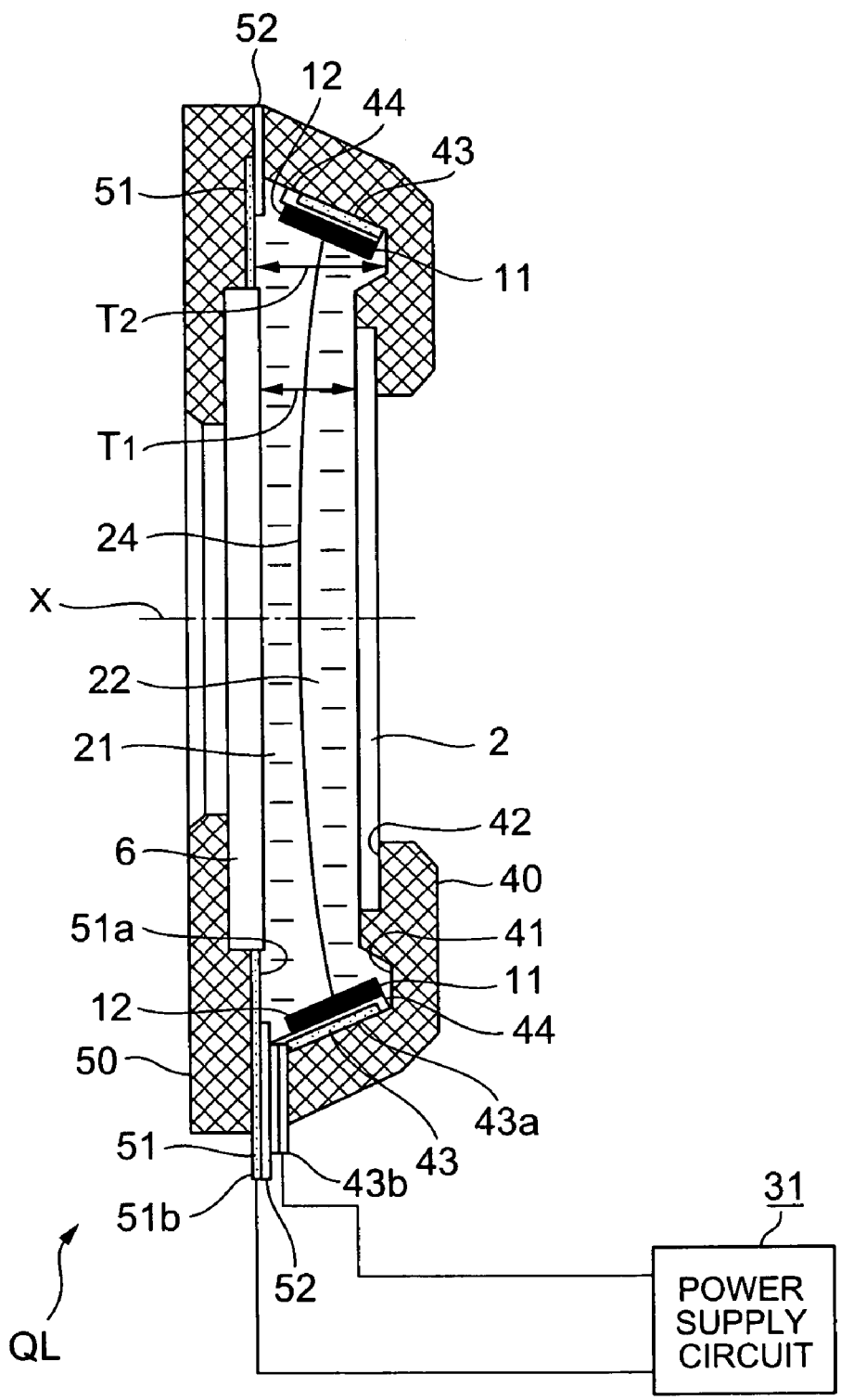
FIG. 6 is a schematic sectional view illustrating a liquid optical element QL and a drive part thereof.

FIG. 6 is a schematic view which shows a configuration of the liquid optical element QL and a drive part. There are shown the liquid optical element QL in this embodiment, and a lower container 40 made of a non-conductive material. A first recess 41 is formed in a peripheral part of a bottom surface (right inner surface as viewed in FIG. 6) of the lower container 40, and a second recess 42 for holding a first sealing plate 2 is formed on the inner diameter side (center side) of the first recess 42. The first sealing plate (a liquid sealing member) 2 is made of transparent acryl resin or glass.

A second electrode ring 43 is provided at the entire inner periphery of a peripheral wall part of the lower container 40, and an insulation layer 44 made of acryl resin or the like, for covering an electrode end surface 43a is formed on and made into close contact with the outer surface of the second electrode ring 43.

It is noted here that the peripheral wall part of the lower container 40 is inclined so as to be near to the optical axis X on the right end side than on the left end side as viewed in the figure. Thus, the first electrode 43 and the insulation layer 44 are both also inclined with respect to the optical axis X.

Further, the thickness of the insulation layer 44 is gradually increased, leftward as viewed in FIG. 6. Further, a water repellent layer 11 coated thereover with a water repellent agent is formed underneath the entire inner periphery of the insulation layer 44. Still further, a hydrophilic layer 12 coated thereover with a hydrophilic agent is formed on the left side of the entire inner periphery of the insulation layer 44.

There is shown an upper container 50 made of a nonconductive material, which holds a second sealing plate (a liquid sealing member) 6 made of acryl resin or glass, on the inner diameter side thereof. Further, a sheet-like first electrode ring 51 is formed on and made into close contact with the left end surface of a peripheral part of the upper container 50.

An insulation layer 52 is formed on and made into close contact with the outer surface of the first electrode ring 51. The insulation layer 52 is formed so as to cover only the outer edge side of the first electrode ring 51 in order to obtain an exposed part 51a which is made into close contact with a first liquid 21 (which will be explainer later) so as to apply a voltage thereto.

Further, the peripheral wall part of the lower container 40 and the upper container are sealed to each other in a liquid-tight manner so as to form a container as a housing having a liquid chamber with a predetermined volume, which is defined by the lower container 40, the upper container 50 and the first and second sealing plates 2, 6.

This container has an axially symmetric shape with respect to the X-axis. Further, the liquid chamber is filled therein with two kinds of liquids as explained hereinafter.

At first, in such a condition that the optical axis X of the lower container 40 attached thereto with the first sealing plate 2 is directed vertically, a second liquid 22 is dripped onto the upper surface of the first sealing plate 2 serving as a liquid bottom surface, and the bottom surface of the outer peripheral side of the lower container 40 (namely, these surface correspond to surfaces opposed to the interface) by a quantity with which the liquid column height of the second liquid 22 becomes an intermediate height of the water repellent membrane 11 in the peripheral wall part.

As the second liquid 22, silicone oil which is colorless and transparent, having a specific weight of 1.06 and a refractive index of 1.45 at a room temperature, is used. Then, the remaining space in the liquid chamber is filled with the first liquid 21. The first liquid 21 (a liquid having a conductivity or a polarity) is an electrolytic solution in which water and alcohol are mixed at a predetermined rate and is added thereto with a predetermined quantity of sodium chloride, so as to have a specific weight of 1.06 and a refractive index of 1.35 at a room temperature.

Namely, as the first and second liquids 21, 22, two kinds of liquids which have an equal specific weight but different refractive indices and which are not mixed with each other (which are insoluble) are selected. Both liquids define therebetween the interface 24, and are present independent from each other, without being mixed with each other.

The shape of the interface 24 is determined by a point at which three kinds of substances, that is, the inner surface of the liquid chamber (container), the first liquid 21 and the second liquid 22, cross one another, or a balance among three interfacial tensions exerted to the outer edge part of the interface 24. Thereafter, the upper container 50 attached thereto with the second sealing plate 6 is fitted to the lower container 40, and thus, the two kinds of liquids are enclosed.

There is shown a power feed circuit 31 connected to the first electrode ring 51 and the second electrode ring 43.

Two amplifiers (which is not shown) in the power feed circuit 31 are connected respectively to terminals 51b, 43b which are led out from the first electrode ring 25 and the second electrode ring 3 in a direction orthogonal to the optical axis along the right end surface of the upper container 50.

With the above-mentioned configuration, when a voltage is applied to the first liquid 21 by way of the first electrode ring 51 and the second electrode ring 43, the interface 24 is deformed due to the so-called electrowetting effect.

Next, explanation will be hereinafter made of the deformation of the interface 24 in the liquid optical element QL, and optical functions exhibited by the deformation.

At first, in the case of no application of a voltage to the first liquid 21, as shown in FIG. 2, the shape of the interface 24 is determined by an interfacial tension between both first and second liquids 21, 22, an interfacial tension between the first liquid 21 and the water repellent membrane 11 or the hydrophilic membrane 12 on the insulation layer 44, an interfacial tension between the second liquid 22 and the water repellent membrane 11 or the hydrophilic membrane 12 on the insulation layer 44, and a volume of the second liquid 22.

Meanwhile, when a voltage is applied from the power supply circuit 31 to the first liquid 21, the interfacial tension between the first liquid 21 and the hydrophilic membrane 12 is decreased due to the electrowetting effect, and accordingly, the first liquid 21 enters onto the water repellent membrane 11, overriding the boundary between the hydrophilic membrane 12 and the water repellent membrane 11. As a result, the height of the second liquid 22 as measured on the optical axis is increased.

Thus, with the application of a voltage to the first liquid 21 through the first and second electrode rings 51, 43, the balance of the interfacial tension between the two kinds of the liquids varies, and accordingly, the shape of the interface 24 between both liquids 21, 22 is changed. Thus, through the voltage control by the power supply circuit 31, it is possible to provide an optical element which can optionally change the shape of the interface 24.

Further, since the first and second liquids 21, 22 have different refractive indices, an optical power (1/f where f is a focal distance) is applied so as to serve as a lens, that is, the liquid optical element QL changes its focal distance due to a variation in the shape of the interface 24.

Explanation will be made of the operation of the zoom lens in the first embodiment, in the case of the zoom drive from the short focal distance end to the long focal distance end, as shown in FIGS. 5A to 5C, the second lens group G2 is moved in the direction of the optical axis from the position shown in FIG. 5A and through the position shown in FIG. 5B, and is then moved to the position shown in FIG. 5C, and in the case of the zoom drive from the long focal distance end to the short focal distance end, the operation is carried out in the reverse order. It is noted that in the case of a convention zoom lens, the first lend group G1 has to be moved in the direction of the optical axis in association with the movement of the second lens group G2 in the direction of the optical axis, and accordingly, it is necessary to provide a cam mechanism for driving the first lens group G1 in the optical direction in order to effect the compensation function, resulting in a complicated configuration and in a large-sized image pick-up device in which the zoom lens is installed.

On the contrary, with the zoom lens in this embodiment, when the zoom drive is carried out in the zoom lens as shown in FIGS. 5A to 5C, the power supply circuit 31 computes a required compensation value from a zoom signal (or refers to a table), and applies a predetermined voltage to the liquid optical element QL. With this control, the liquid optical element QL optionally changes its optical power so as to materialize a compensation function. Thus, it is possible to eliminate the necessity of a mechanism for moving the first lens group G1 in the direction of the optical axis, thereby it is possible to aim at simplifying the configuration of the zoom lens and at making the zoom lens compact. It is preferable to change the optical power, multi-stepwise, and is more preferable to change the optical power, continuously.

Further, in a conventional zoom lens in which the displacement of the first lens group in the direction of the optical axis corresponds to that of the second lens group in the direction of the optical axis at a ratio of 1:1 due to a shape of a cam, since the object distance is variable in actual image pick-up, the third lens group G3 should be moved in the direction of the optical axis in order to adjust a focus on a light receiving surface of an image pick-up element CCD or the like in association with the movement of the first and second lens groups G1, G2 in order to effect a focus function. In this case, it is necessary to add a separate drive mechanism for the third lens group G3, resulting in a complicated configuration, and in a large sized zoom lens.

On the contrary, in the first embodiment, the power supply circuit 31 changes the shape of the liquid optical element QL in accordance with a signal from the image pick-up element CCD or a measured distance signal from a distance measuring equipment which is not shown, and a zoom signal (a displacement of the second lens group G2 in the direction of the optical axis) in order to simultaneously effect the compensation function and the focus function (further, it may execute a part of the zooming function). In this case, it is possible to offer such a technical effect that the movement of the third lens group G3 in the direction of the optical axis is not required.

Figure 7A:
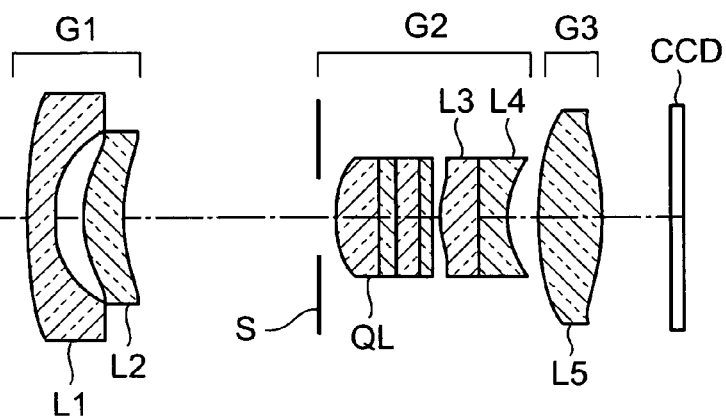
FIG. 7A to 7C are sectional views illustrating a zoom lens in a second embodiment of the present invention.
Figure 7B:
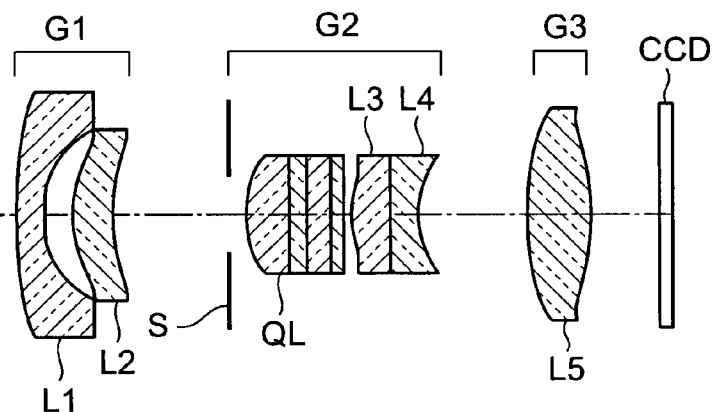
Figure 7C:
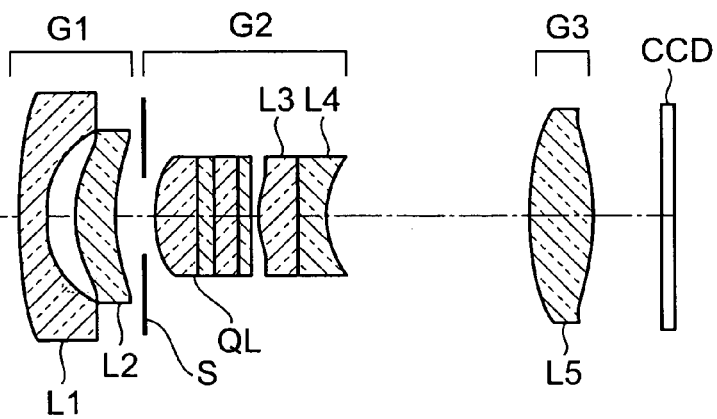

FIGS. 7A to 7C are sectional views which show a zoom lens in a second embodiment of the present invention, and among which FIG. 7A shows a short focal distance end condition, FIG. 7B is an intermediate condition and FIG. 7C is a long focal distance condition.

In this second embodiment, the zoom lens has lens groups G1 to G3 for focusing an object image on an image pick-up element CCD. The first lens group G1 is composed of a negative first lens L1 and a positive second lens L2, and is fixed to a lens frame which is not shown. The second lens group G2 is composed of a diaphragm S, a liquid optical element QL, a positive third lens L3 and a negative fourth lens L4, which are moved integral with one another in the direction of the optical axis. The third lens group G3 is composed of a positive fifth lens L5 which is fixed to a lens frame which is not shown. It is noted that the basic configuration of the liquid optical element QL used in this embodiment is the same as that shown in FIG. 6, and accordingly, the explanation thereof will be omitted.

Explanation will be made of the operation of the zoom lens in the second embodiment, in the case of zoom drive from the short focal distance end to the long focal distance end, as shown in FIG. 6, the second lens group G2 is moved in the direction of the optical axis from the position shown in FIG. 7A and through the position shown in FIG. 7B, and is moved to the position shown in FIG. 7C. The zoom drive from the long focal distance end to the short focal distance end, the operation is made in the reverse order.

In the second embodiment, when the zoom operation of the zoom lens shown in FIGS. 5A to 5C is executed, the power supply circuit for the liquid optical element QL computes a required compensation value from a zoom signal (or refers to a table), and applies a predetermined voltage to the liquid optical element QL. Through such control, the liquid optical element QL optionally changes optical power so as to effect a compensation function. Thus, it is possible to eliminate the necessity of a mechanism for moving the first lens group G1 in the direction of the optical axis, thereby it is possible to aim at simplifying the configuration of the zoom lens and making the zoom lens compact. It is preferable to change the optical power multi-stepwise, and it is more preferable to change the optical power, continuously.

Further, in the second embodiment, the power supply circuit for the liquid optical element QL can change the shape of the liquid optical element QL in accordance with a signal from the image pick-up element CCD or a measured distance signal from a distance measuring equipment and a zoom signal (or a displacement of the second lens group G2 in the direction of the optical axis) in order to simultaneously effect the compensation function and the focus function (further, it may effect a part of the zooming function). In this case, it is possible to offer such a technical effect that the movement of the third lens group G3 in the direction of the optical axis is not necessary.

By allowing the liquid optical element QL to have a complete zooming function in the first and second embodiments, all lens groups can be fixed in the direction of the optical axis. Thereby, it is possible to provide a zoom lens with no drive mechanism for lens groups.

Figure 10:
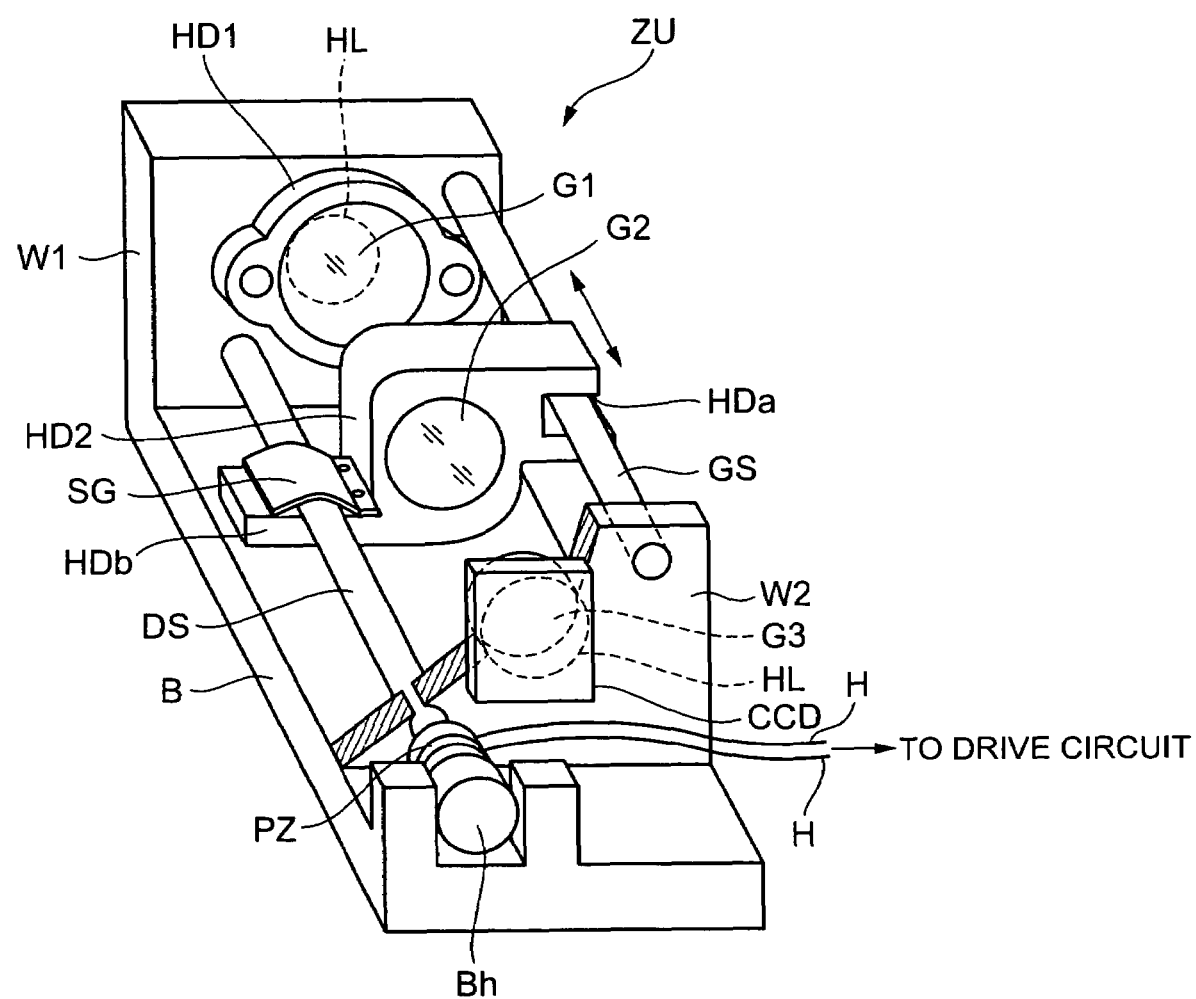
FIG. 10 is a perspective view illustrating a zoom lens unit ZU in which a zoom lens in the above-mentioned embodiments and a drive means therefor are incorporated, integral with each other.

FIG. 10 is a perspective view which shows a zoom lens unit ZU in which the zoom lens in the above-mentioned embodiments and a drive means therefor are incorporated, integral with each other. Referring to FIG. 10, walls W1, W2 are extended upward from opposite ends of a base B. A guide shaft GS is extended so to couple the walls W1, W2 (which are shown being cutout) in the vicinity of the upper ends thereof. Further, the walls W1, W2 are formed therein with opening holes HL, respectively, through which a light beam passes.

The first lens group G1 is held at its outer periphery by a lens holder HD1, and is mounted so as to cover the opening hole HL in the wall W1. It is preferable to restrain a shift or a tilt with respect to a reference axis as possible as it can with the use of an autocollimator or the like during assembly of the first lens group G1.

Meanwhile, the second lens group G2 serving as an optical element group for zooming, is held at its outer periphery by a lens holder HD2. The lens holder HD2 serving as a movable member comprises an engaging part HDa engaged with the guide shaft GS, and a coupling part HDb for receiving a drive force.

The coupling part HDb is formed therein with a groove which makes contact with a drive shaft DS, and is attached at its upper surface with a leaf spring SG. The drive shaft DS serving as a drive member is held between the coupling part HDb and the leaf spring SG, and is appropriately pressed by an urging force of the leaf spring SG. A gap is defined at one end of the drive shaft DS on the wall W1 side, and the other end part of the drive shaft DS is extended through the wall W2 and is coupled to a piezoelectric actuator PZ serving as an electromechanical conversion element. The piezoelectric actuator PZ has a fixing part Bh which is fixed to the base B outside of the wall W2 by an adhesive or the like.

The third lens group G3 is fitted in the opening hole HL in the wall W2. Further, adjacent to the third lens group G3, a solid image pick-up element CCD is attached to the wall W2. The relationship among the first lens group G1, the second lens group L2 and the third lens group L3 in the direction of the optical axis is as shown in FIGS. 5A to 5C and FIGS. 7A to 7C.

An external drive circuit (which is not shown) is provided on the base B, and is adapted to receive a signal from an encoder which is not shown (which is a position detecting means composed of, for example, magnetic information arranged on the guide shaft GS and a reading head mounted on the engaging part HDa) for magnetically detecting a displacement of the engaging part HDa, and to apply the drive voltage to the piezoelectric actuator PZ by way of wiring H in order to drive and control the piezoelectric actuator PZ. The drive means is composed of piezoelectric actuator PZ, the drive shaft DS, the coupling part HDb and the leaf spring SG. It is noted that the drive circuit arranged on the base B may be connected by wiring.

Figure 11:
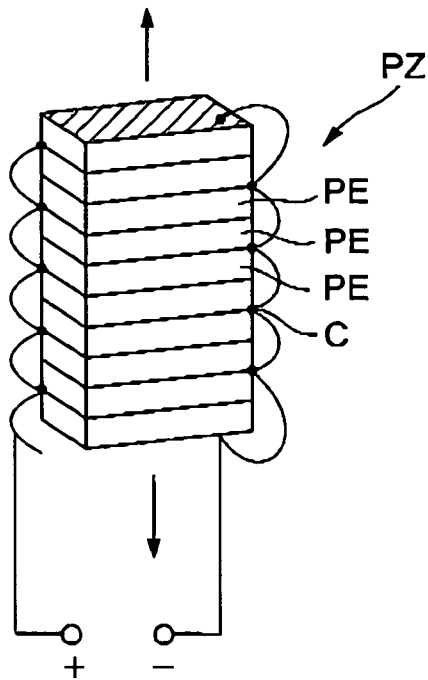
FIG. 11 is a perspective view illustrating a lamination type piezoelectric actuator PZ having a structure in which a plurality of piezoelectric ceramics PE are laminated one upon another, and electrodes C interposed therebetween are connected in parallel.

The piezoelectric actuator PZ is composed of piezoelectric ceramics which are made of PZT (lead zironate titanate) and which are laminated one upon another. The piezoelectric ceramic has, in crystal lattice, a positive electric charge and a negative electric charge whose gravitation centers are not coincident with each other, and is itself polarized. Accordingly, when the drive voltage is applied to the piezoelectric ceramic in its polarizing direction, it is elongated. However, the degree of distortion of the ceramic in this direction is extremely small, and accordingly, it is difficult to drive a member to be driven by this small degree of the distortion. Thus, as shown in FIG. 11, there are provided a lamination type piezoelectric actuator PZ having such a configuration that a plurality of piezoelectric ceramics PE are laminated one upon another and electrodes C are interposed therebetween and are connected in parallel with one another. In the zoom lens of the present invention, this lamination type piezoelectric actuator PZ is used as a drive source.

Figure 12A:
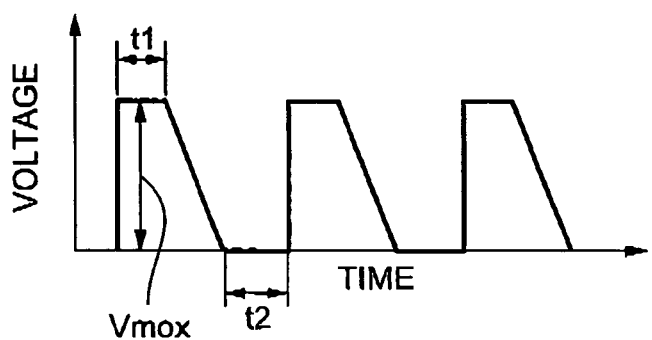
FIGS. 12A and 12B are views which show waveforms of voltage pulses applied to the piezoelectric actuator PZ.
Figure 12B:
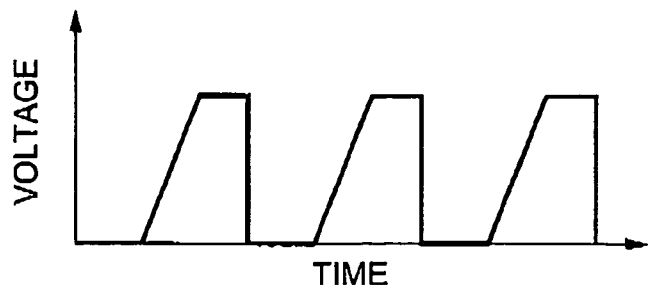

Next, explanation will be made of a method of driving the second lens group G2 by the zoom lens unit ZU. In general, the lamination type piezoelectric actuator PZ exhibits a small displacement upon application of the drive voltage, but produces a large force with a sharp response. Accordingly, as shown in FIG. 12A, by applying voltage pulses each having a saw-like waveform having a steep leading edge but a gentle tailing edge to the lamination type piezoelectric actuator PZ, the actuator PZ abruptly expands at the leading edge of the pulse but slowly contracts at a trailing edge thereof. Thus, upon extension of the piezoelectric actuator PZ, the drive shaft DS is pushed inward in FIG. 10 (toward the wall W1 side) by an impact force thereby, but the coupling part HDb of the lens holder HD2 which holds the second lens group G2 and the leaf spring SG do not move together with the drive shaft DS due to their inertia but slip on the drive shaft DS so as to stay in a present position (although slight movement is possibly caused). Meanwhile, since the drive shaft DS moves back at the trailing edge of the pulse, slowly, in comparison with the leading edge thereof, the coupling part HDb and the leaf spring SG do not slip on the drive shaft DS, but move integral with the drive shaft DS toward the near side (toward the wall W2) in FIG. 10. That is, by applying pulses having a frequency set in a range from several hundred to several ten thousand Hz, the lens holder HD2 can be moved at a desired speed. As clearly understood from the above, if a pulse having a gentle leading edge but a steep trailing edge as shown in FIG. 12B is applied, the lens holder HD2 can be moved in the reverse direction. In particular, if the guide shaft GS is straight, the lens holder HD2 is precisely moved in the direction of the optical axis, thereby it is possible to effectively restrain deterioration of aberration in comparison with such a configuration that deviation of the optical axis occurs.

As described above, it becomes possible to change the speeds of extensions and contractions of the zoom lens in accordance with the shape of pulse applied to the piezoelectric actuator PZ as the electromechanical conversion element.

In addition, due to repetitions of extension and contraction of the piezoelectric actuator PZ, the movable member (lens holder HD2) can be continuously moved in one direction. That is, with the use of the drive means according to the present invention, having a high responsiveness, the optical element groups which are moved upon zooming can be moved at a high speed, and can be also moved by a slight displacement. Further, in such a case that the optical element groups which are moved upon zooming, are held in position, when the supply of an electric power to the piezoelectric actuator PZ is interrupted, they are held by a friction force between the movable member and the drive member, thereby it is possible to aim at saving energy. In addition, it can offer such an advantage that the configuration of the drive means can be simplified, and can be at a low cost.

Explanation will be made of two exemplified embodiments of the zoom lens according to the present invention. The following marks will be used in the exemplified embodiments.

f: Focal distance of an entire image pick-up lens system;
F: F number
T: Object distance
R: Radius of curvature
D: On-axis inter-surface space
Nd: Refractive Index of lens material with respect to d-ray
vd: Abbe's Number of lens material The shape of an aspheric surface in each of the exemplified embodiments can be exhibited by the following formula (1) where the vertex of the spherical surface is set an original point and X-axis is set in the direction of the optical axis:

$$X = \frac{h^2/R}{1 + \sqrt{1 - (1+K)h^2/R^2}} + \sum A_i h^i \quad (1)$$

where
h: is a height in a direction perpendicular to the optical axis
$A_i$: i-order aspheric coefficient
R: radius of curvature
K: Conical Constant Exemplified Embodiment 3

Figure 8A:
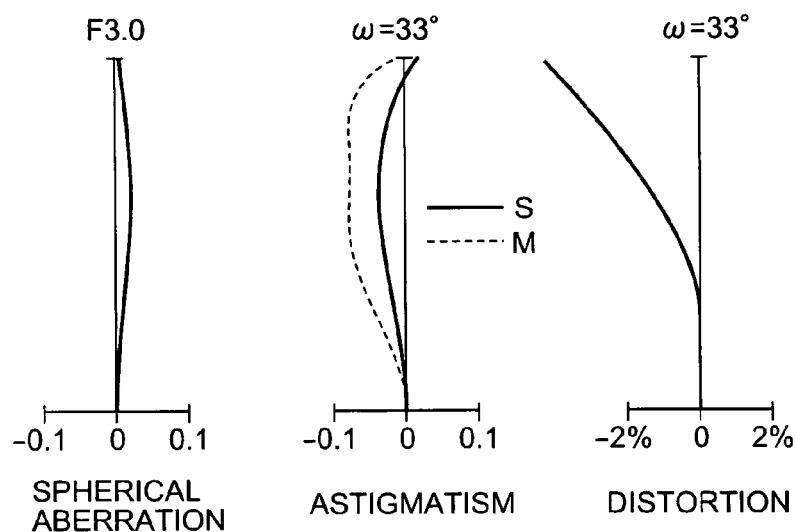
FIGS. 8A to 8C are views which show aberrations of the zoom lens in the first embodiment of the present invention.
Figure 8B:
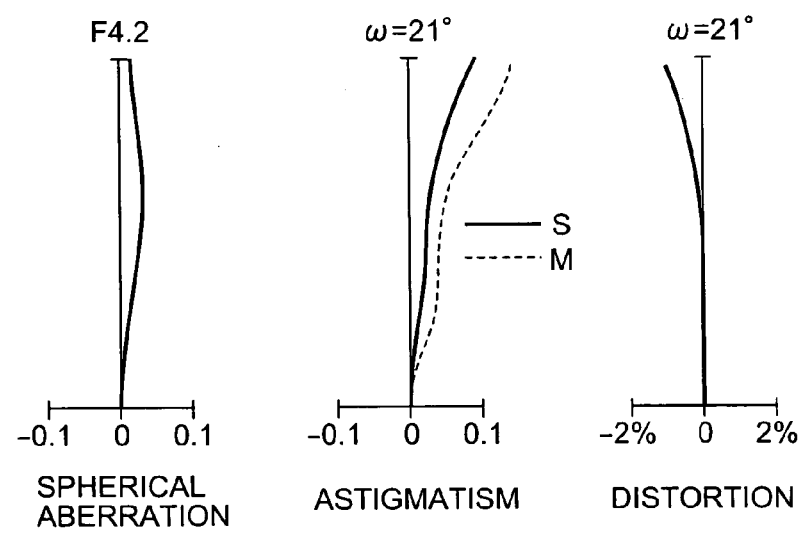
Figure 8C:
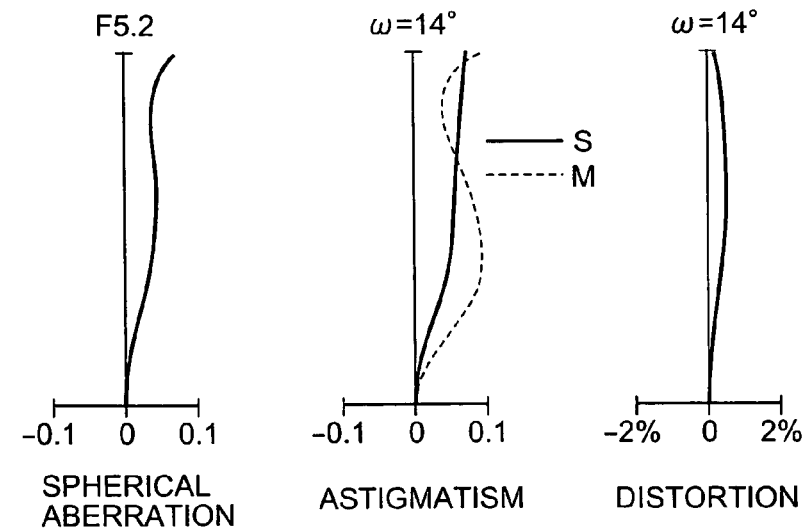

The exemplified embodiment 3 which will be explained hereinafter concerns the zoom lens in the third embodiment. Data of the zoom lens in this exemplified embodiment 3 is listed in table 5, and radii R5 of curvature at a short focal distance end, an intermediate focal distance and a long focal distance end with an object distance T=∞, inter-surface spaces D4, D5 and F as F-number, a focal distance f of an entire image pick-up lens system and a viewing angle 2ω are listed in table 6. Further, aspheric data are listed in table 7, and further, radii R5 of curvature at a short focal distance end and a long focal distance end with an object distance T=250 mm, and inter-surface spaces D4, D5 are listed in table 8. Further, FIGS. 8A and 8C show aberration charts at a short focal distance (FIG. 8A), at an intermediate focal distance (FIG. 8B) and at a long focal distance (FIG. 8C) with an object distance T=°° in the exemplified embodiment 3. It is noted here that the object distance is from the object to the vertex of the most object side surface of the zoom lens. It is noted that a power number of 10 (for example, 2.5× $10^{-03}$ is exhibited by E (for example, 2.0E−03).

TABLE 5

| | f = 4.5 mm~7.3 mm~11.2 mm | | |
| | F = 3.0~4.2~5.2 | | |
| | 2ω = 66°~42°~28° | | |
| Surface No. | R (mm) | D (mm) | Nd |
|---|---|---|---|
| 1 | −29.924 | 0.80 | 1.53180 |
| 2 | 4.382 | 2.07 | |
| 3 | 12.064 | 1.39 | 1.60700 |
| 4 | ∞ | D4(variable) | 1.35000 |
| 5 | R5(variable) | D5(variable) | 1.45000 |
| 6 | ∞ | 0.80 | 1.53180 |

TABLE 5-continued

| | f = 4.5 mm~7.3 mm~11.2 mm | | |
| | F = 3.0~4.2~5.2 | | |
| | 2ω = 66°~42°~28° | | |
| Surface No. | R (mm) | D (mm) | Nd |
|---|---|---|---|
| 7 | 104.888 | D7(variable) | |
| Diaphragm | ∞ | 0.40 | |
| 8 | 4.870 | 1.52 | 1.58913 |
| 9 | −12.045 | 0.22 | |
| 10 | 7.844 | 1.50 | 1.53180 |
| 11 | −34.269 | 1.28 | 1.60700 |
| 12 | 2.606 | D12(variable) | |
| 13 | 5.725 | 3.27 | 1.53180 |
| 14 | 58.204 | 2.20 | |
| 15 | ∞ | 0.50 | 1.51633 |
| 16 | ∞ | | |

TABLE 6

| | T = ∞ | | |
|---|---|---|---|
| | Short focal distance end | Intermediate focal distance | Long focal distance end |
| f | 4.5 | 7.3 | 11.2 |
| F | 3.0 | 4.2 | 5.2 |
| 2ω | 66° | 42° | 28° |
| R5 | ∞ | −15.00 | ∞ |
| D4 | 0.50 | 0.73 | 0.50 |
| D5 | 0.75 | 0.52 | 0.75 |
| D7 | 8.85 | 4.38 | 0.55 |
| D12 | 1.50 | 5.97 | 9.80 |

TABLE 7

| Aspheric Coefficient | |
|---|---|
| 1st Surface: | |
| A4 = | 7.03770E−04 |
| A6 = | 2.16940E−06 |
| A8 = | −9.72750E−07 |
| A10 = | 1.34040E−08 |
| 2nd Surface: | |
| A4 = | −1.94030E−03 |
| A6 = | 1.40750E−04 |
| A8 = | −9.95290E−06 |
| 3rd Surface: | |
| K = | 6.46670E−01 |
| A4 = | −1.39680E−03 |
| A6 = | 5.41890E−05 |
| A8 = | −4.77660E−06 |
| A10 = | 3.46040E−07 |
| 7th Surface: | |
| A4 = | −9.79050E−04 |
| A6 = | 2.99920E−05 |
| A8 = | −3.73820E−07 |
| A10 = | 2.83750E−07 |
| 10th Surface: | |
| K = | −3.88660E−00 |
| A4 = | −2.98360E−03 |
| A6 = | −3.04150E−05 |
| A8 = | −3.42510E−05 |
| A10 = | 1.76260E−06 |
| 12th Surface: | |
| K = | 1.86790E−01 |
| A4 = | −6.44580E−03 |
| A6 = | −1.14390E−03 |

TABLE 7-continued

Aspheric Coefficient

A8 = 1.77060E−04
A10 = −6.65490E−05

13th Surface:

K = 7.17560E−01
A4 = −1.15060E−03
A6 = 4.71500E−05
A8 = 6.76360E−07
A10 = −2.22870E−07

14th Surface:

A4 = 2.20080E−04
A6 = −1.03240E−04
A8 = 3.91670E−05
A10 = −2.85110E−06
A12 = 6.65910E−08

TABLE 8

T = 250 mm

| | Short focal distance end | Long focal distance end |
|---|---|---|
| R5 | 48.40 | 48.40 |
| D4 | 0.50 | 0.50 |
| D5 | 0.75 | 0.75 |

As listed in table 6, by changing the focal distance from the short focal distance end to the long focal distance end and by changing the radius of curvature of the interface in the liquid optical element QL, compensation for correcting a focus movement caused by zooming can be carried out, and as listed in table 8, by changing the radius of curvature of the interface in association with a variation in object distance, focusing can be made. Thus, the lens groups other than the second lens group serving as a lens group for zooming can be fixed to lens frames, it is possible to provide a zoom lens having a simple mechanism with a less number of driven lenses. Further, with such a configuration in which the radius of curvature of the interface has an extremum while the focal distance is changed from the short focal distance end to the long focal distance end, a variation in the refractive power of the liquid optical element QL can be less, thereby it is possible to simplify the control of the liquid optical element QL.

Further, in the case of no application of a voltage to the liquid optical element QL, or in the case of application of a lower voltage, the shape of the interface is set so as to obtain a refractive power which is frequently used upon image pick-up, thereby it is possible to provide a zoom lens with less power consumption. Thus, it is more preferable.

Exemplified Embodiment 4

The exemplified embodiment 4 which will be explained hereinbelow concerns the zoom lens in the fourth embodiment. Data of the zoom lens in this exemplified embodiment 4 is listed in table 9, and radii R5 of curvature at a short focal distance end, an intermediate focal distance and a long focal distance end with an object distance T=∞, inter-surface spaces D4, D5 and F as F-number, a focal distance f of an entire image pick-up lens system and a viewing angle 2ω are listed in table 10. Further, aspheric data are listed in table 11, and further, radii R5 of curvature at a short focal distance end, an intermediate focal distance and a long focal distance end with an object distance T=250 mm, and inter-surface spaces D4, D5 are listed in table 12.

Figure 9A:
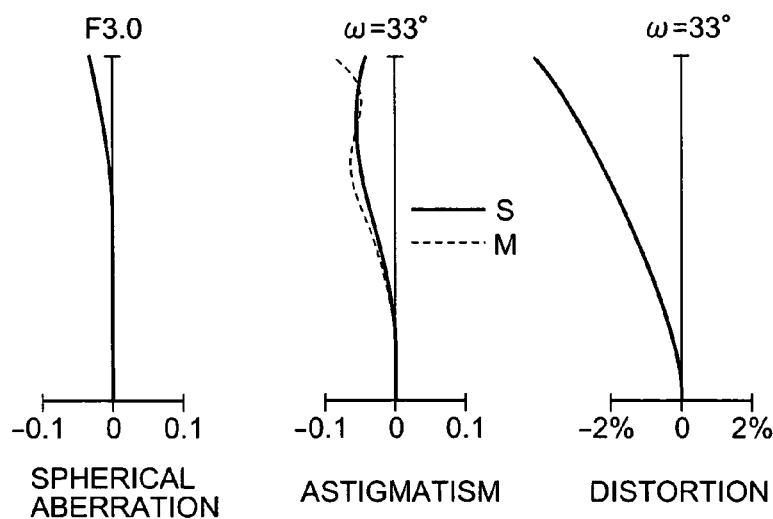
FIG. 9A to 9C are views which show aberrations of the zoom lenses in the first embodiment.
Figure 9B:
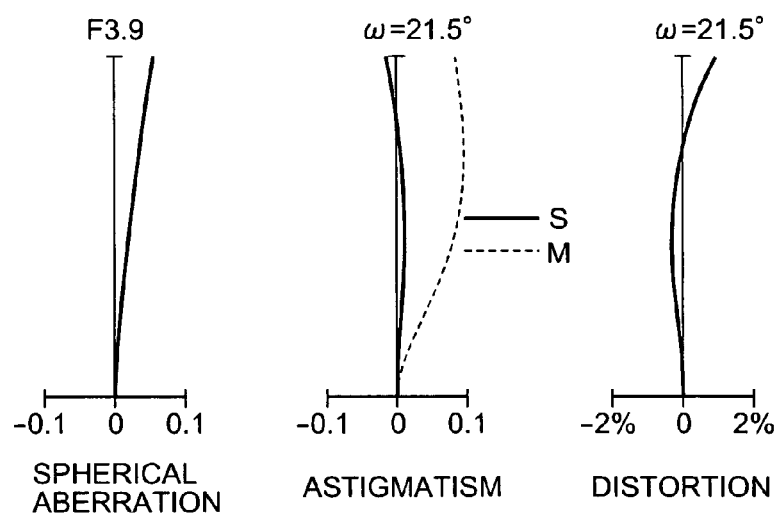
Figure 9C:
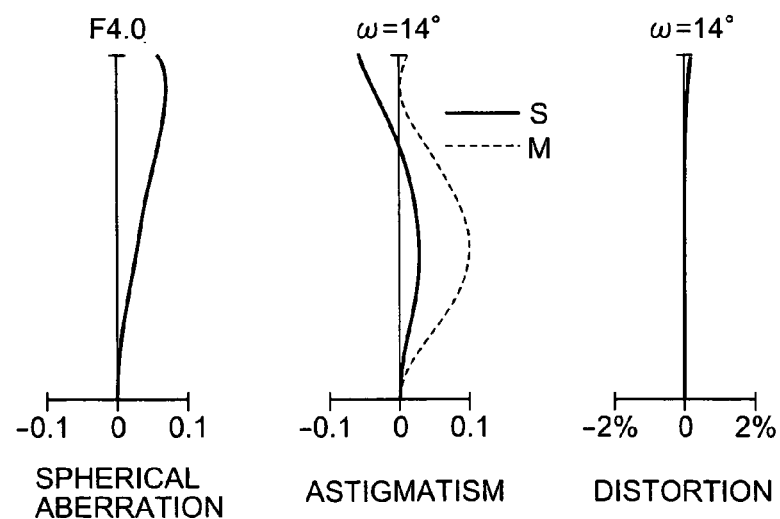

Further, FIGS. 9A and 9C show aberration charts at a short focal distance (FIG. 9A), at an intermediate focal distance (FIG. 9B) and at a long focal distance (FIG. 9C) with an object distance T=∞ in the exemplified embodiment 4. It is noted here that the object distance is from the object to the vertex of the most object side surface of the zoom lens. It is noted that a power number of 10 (for example, 2.5× $10^{-03}$ is exhibited by E (for example, 2.0E−03).

TABLE 9 f = 4.5 mm~7.0 mm~11.1 mm
F = 3.0~3.9~4.9
2ω = 66°~43°~28°

| Surface No. | R (mm) | D (mm) | Nd | νd |
|---|---|---|---|---|
| 1 | −27.144 | 0.80 | 1.53180 | 56.0 |
| 2 | 5.359 | 0.94 | | |
| 3 | 5.239 | 1.29 | 1.60700 | 27.0 |
| 4 | 5.566 | D4(variable) | | |
| Diaphragm | ∞ | 0.40 | | |
| 5 | 3.577 | 1.40 | 1.58913 | 61.2 |
| 6 | ∞ | D6(variable) | 1.35000 | 59.0 |
| 7 | R7(variable) | D7(variable) | 1.45000 | 44.0 |
| 8 | ∞ | 0.50 | 1.51633 | 64.1 |
| 9 | ∞ | 0.20 | | |
| 10 | 4.231 | 1.22 | 1.53180 | 56.0 |
| 11 | 54.916 | 0.80 | 1.60700 | 27.0 |
| 12 | 2.704 | D12(variable) | | |
| 13 | 11.347 | 2.01 | 1.53180 | 56.0 |
| 14 | −9.726 | 2.05 | | |
| 15 | ∞ | 0.50 | 1.51633 | 64.1 |
| 16 | ∞ | | | |

TABLE 10

T = ∞

| | Short focal distance end | Intermediate focal distance | Long focal distance end |
|---|---|---|---|
| f | 4.5 | 7.0 | 11.1 |
| F | 3.0 | 3.9 | 4.9 |
| 2ω | 66° | 43° | 28° |
| R7 | −33.00 | −14.30 | 22.00 |
| D4 | 6.15 | 3.63 | 0.72 |
| D6 | 0.58 | 0.61 | 0.51 |
| D7 | 0.67 | 0.64 | 0.74 |
| D12 | 1.00 | 3.52 | 6.43 |

TABLE 11

Aspheric Coefficient

1st Surface:

A4 = 1.40080E−02
A6 = −1.44900E−03
A8 = 6.18690E−05
A10 = −9.29280E−07

2nd Surface:

A4 = 1.70690E−02
A6 = 1.06930E−03
A8 = −2,13460E−04

TABLE 11-continued

Aspheric Coefficient

3rd Surface:

| | |
|---|---|
| K = | −1.55790E−01 |
| A4 = | 7.24870E−03 |
| A6 = | 1.80440E−04 |
| A8 = | 2.97720E−05 |
| A10 = | −1.51380E−05 |

4th Surface:

| | |
|---|---|
| A4 = | −9.03080E−03 |
| A6 = | 2.27360E−03 |
| A8 = | −4.15700E−04 |
| A10 = | 2.06310E−05 |

10th Surface:

| | |
|---|---|
| K = | −2.72330E−00 |
| A4 = | −4.87790E−03 |
| A6 = | −1.14690E−03 |
| A8 = | −1.63160E−04 |
| A10 = | −1.01850E−05 |

12th Surface:

| | |
|---|---|
| K = | 1.47700E−02 |
| A4 = | −4.62840E−03 |
| A6 = | −1.36410E−03 |
| A8 = | −2.92520E−04 |
| A10 = | −4.42360E−05 |

13th Surface:

| | |
|---|---|
| K = | 5.15310E−00 |
| A4 = | −3.00180E−03 |
| A6 = | 4.48110E−04 |
| A8 = | −2.06570E−05 |
| A10 = | 6.95950E−07 |

14th Surface:

| | |
|---|---|
| A4 = | −3.03100E−03 |
| A6 = | 4.03150E−04 |
| A8 = | −1.22050E−05 |
| A10 = | 7.67460E−07 |

TABLE 12

T = 250 mm

| | Short focal distance end | Long focal distance end |
|---|---|---|
| R7 | −68.40 | 12.95 |
| D6 | 0.58 | 0.51 |
| D7 | 0.67 | 0.74 |

As listed in table 10, by changing the focal distance from the short focal distance end to the long focal distance end and by changing the radius of curvature of the interface in the liquid optical element QL, compensation for correcting a focus movement caused by zooming can be carried out while contributing to zoom, and as listed in table 12, by changing the radius of curvature of the interface in association with a variation in object distance, focusing can be made. Thus, the lens groups other than the second lens group serving as a lens group for zooming can be fixed to lens frames, it is possible to provide a zoom lens having a simple mechanism with a less number of driven lenses. Further, with such a configuration in which the radius of curvature of the interface has an extremum while the focal distance is changed from the short focal distance end to the long focal distance end, a variation in the refractive power of the liquid optical element QL can be less, thereby it is possible to simplify the control of the liquid optical element QL.

Further, in the case of no application of a voltage to the liquid optical element QL, or in the case of application of a lower voltage, the shape of the interface is set so as to obtain a refractive power which is frequently used upon image pick-up, thereby it is possible to provide a zoom lens with less power consumption. Thus, it is more preferable.

The embodiments of the present invention have been described above. The present invention is not limited to the above embodiments, and various changes and modifications can appropriately be made. For example, the third lens group G3 may be a refractive power variable element. The lens group may include only a single refractive power variable element or a combination of a normal lens and refractive power variable element. The type of the refractive power variable element is not particularly limited. Any element which can change the refractive power by changing the shape of the lens surface or the refractive index of the material can be used. The zoom lens of the present invention is preferably mounted in an image sensing apparatus such as a compact digital still camera or a portable terminal such as a cellular phone or PDA. However, the present invention is not limited to this.

What is claimed is:

1. A zoom lens in which a plurality of optical element groups including at least an optical element group which moves in zooming are arranged in a lens system,
   wherein at least one of the plurality of optical element groups comprises a combination of a normal lens and a transparent refractive power variable element having a compensation function to correct focus movement caused by zooming, a focusing function to correct focus movement caused by a variation in inter-object distance, and a zooming function.

2. A zoom lens according to claim 1, wherein a refractive power of the optical element group including the transparent refractive power variable element has an extremum during zooming.

3. A zoom lens according to claim 1, wherein the refractive power is changed by changing a radius of curvature of an optical surface at which the transparent refractive power variable element contacts air.

4. A zoom lens according to claim 1, wherein the refractive power is changed by changing a refractive index of an optical material making the optical element.

5. A zoom lens according to claim 1, wherein only one optical element group moves in zooming.

6. A lens according to claim 1, wherein the optical element group including the transparent refractive power variable element includes a diaphragm.

7. A zoom lens according to claim 1, wherein the transparent refractive power variable element comprises a liquid optical element including a first liquid having a conductivity or a polarity and a second liquid which is not mixed with the first liquid, the first liquid and the second liquid being enclosed in a container fluid-tight so as to define an interface therebetween having a predetermined shape, the liquid optical element being arranged such that a refractive power thereof is adjusted by changing a curvature of the interface.

8. A zoom lens according to claim 7, wherein the liquid optical element is arranged in an optical element group which includes a diaphragm.

9. A zoom lens according to claim 7, wherein in the case of an optical element group which does not include a diaphragm but the liquid optical element, the liquid optical element is arranged at a position neared to the diaphragm.

10. A camera, comprises:
a zoom lens having at least an optical element group provided in a plurality of optical element groups arranged in a lens system, the optical element group being made to move in zooming,
wherein at least one of the plurality of optical element groups comprises a combination of a normal lens and a transparent refractive power variable element having a compensation function to correct focus movement caused by zooming, a focusing function to correct focus movement caused by a variation in inter-object distance, and a zooming function.

* * * * *